United States Patent
Saleh et al.

(10) Patent No.: US 7,363,588 B2
(45) Date of Patent: Apr. 22, 2008

(54) GUI FOR ORGANIZATIONAL ENVIRONMENT

(75) Inventors: Nayel Saleh, Round Lake, IL (US); Mark Powers, Carol Stream, IL (US); Mike Peters, Downers Grove, IL (US); Jeff Hodson, Wheaton, IL (US); Craig Shambaugh, Wheaton, IL (US); David Funck, Wheaton, IL (US); Eric James, Elgin, IL (US); Joseph Bloom, Libertyville, IL (US); Dave Mosquera, West Chicago, IL (US); Anthony Dezonno, Bloomingdale, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 674 days.

(21) Appl. No.: 10/285,868

(22) Filed: Nov. 1, 2002

(65) Prior Publication Data
US 2004/0085344 A1    May 6, 2004

(51) Int. Cl.
*G09G 5/00* (2006.01)
*G06K 15/00* (2006.01)

(52) U.S. Cl. ..................... 715/746; 715/749
(58) Field of Classification Search ........ 715/746–747, 715/745, 740, 748, 762, 763, 788, 789, 778, 715/730; 709/201; 713/182; 707/10, 100; 725/51, 48
See application file for complete search history.

(56) References Cited

U.S. PATENT DOCUMENTS

| | | |
|---|---|---|
| 5,555,179 A | 9/1996 | Koyama et al. |
| 5,765,033 A | 6/1998 | Miloslavsky |
| 5,802,530 A | 9/1998 | Van Hoff ................ 707/513 |
| 5,818,446 A | 10/1998 | Bertram et al. ............ 345/334 |
| 5,892,905 A | 4/1999 | Brandt et al. .......... 395/187.01 |
| 5,926,539 A | 7/1999 | Shtivelman |
| 5,946,387 A | 8/1999 | Miloslavsky |
| 5,953,332 A | 9/1999 | Miloslavsky |
| 5,953,405 A | 9/1999 | Miloslavsky |
| 6,002,760 A | 12/1999 | Gisby |
| 6,012,071 A | 1/2000 | Krishna et al. ............ 707/522 |
| 6,014,638 A | 1/2000 | Burge et al. ................ 705/27 |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |

(Continued)

OTHER PUBLICATIONS

Angel, Jonathan. IT Architect—Proxy Servers. United Business Media: Apr. 1, 1999. p. 1.*

(Continued)

*Primary Examiner*—Steven Sax
(74) *Attorney, Agent, or Firm*—Welsh & Katz, Ltd.

(57) ABSTRACT

A method and apparatus are described for providing a graphical user interface for a plurality of users under a predetermined format substantially controlled by an employer of the plurality of users. The method includes the steps of disposing a proxy server between the plurality of users and an information resource used by at least one user of the plurality of users and converting information exchanged between the predetermined format substantially controlled by the employer of the user and a predetermined format of the information resource.

24 Claims, 2 Drawing Sheets

U.S. PATENT DOCUMENTS

| | | |
|---|---|---|
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,185,567 B1 * | 2/2001 | Ratnaraj et al. ............... 707/10 |
| 6,275,225 B1 | 8/2001 | Rangarajan et al. ......... 345/333 |
| 6,292,185 B1 | 9/2001 | Ko et al. ..................... 345/334 |
| 6,342,907 B1 * | 1/2002 | Petty et al. .................. 715/762 |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,732,156 B2 | 5/2004 | Miloslavsky |
| 6,944,826 B2 * | 9/2005 | Thornton ................... 715/733 |
| 7,118,018 B2 * | 10/2006 | Turk ........................... 227/10 |
| 2002/0052230 A1 * | 5/2002 | Martinek et al. ............. 463/10 |
| 2002/0085029 A1 * | 7/2002 | Ghani ......................... 345/751 |
| 2002/0143786 A1 * | 10/2002 | Ayi et al. .................... 707/102 |
| 2003/0070170 A1 * | 4/2003 | Lennon ....................... 725/51 |
| 2003/0137539 A1 * | 7/2003 | Dees .......................... 345/762 |
| 2003/0181991 A1 * | 9/2003 | Chau et al. ................... 700/1 |
| 2004/0003071 A1 * | 1/2004 | Mathew et al. ............. 709/223 |

OTHER PUBLICATIONS

Examiner's Automated Search Tool (EAST). United States Patent & Trademark Office. Version 2.0.1 (1999).*

Microsoft Word 2000. Microsoft Corporation. 9.0.6926 (1999).*

* cited by examiner

GUI FOR ORGANIZATIONAL ENVIRONMENT

FIELD OF THE INVENTION

The field of the invention relates to computer displays and more particularly to multidisciplinary displays used within an organizational environment.

BACKGROUND OF THE INVENTION

Graphical User Interfaces (GUIs) for specific software applications are known. Typically software applications are developed by third parties for specific organizational needs (e.g., accounting, purchasing, order processing, payroll, time-entry, engineering change order systems, etc.). Such applications are-typically designed with a number of windows, where each window may represent a separate control process or information display element.

Where used as a control process, the window(s) may have one or more icons (i.e., soft keys) that trigger associated programs. Soft keys may be displayed in conjunction with static information display windows or with interactive windows. Where used for static information windows, the soft keys may be used to make menu selections. When used with interactive windows, the soft keys may be used to signal completion of the entry of information into the interactive window.

Because of the inherent flexibility in the use of windows, there is very little similarity among third-party software applications. Accounting applications may be structured according to one format, payroll according to a second format, purchasing to a third, order processing to a fourth, engineering change orders to a fifth, etc. Frequently, the format used is more a matter of aesthetics than functionality.

Because of the variations among third-party software, an organizational user familiar with one third-party application may have great difficulty using another third-party application. For example, an engineer familiar with an engineering change order system often cannot perform cost-benefit analysis on engineered products because of the difficulty of learning and using accounting and purchasing systems.

The barrier to using third-party software in an organizational context reduces the efficiency of users that would benefit from the free flow of information among the different organizational disciplines. Accordingly, a need exists for a method of reducing the complexity of using third-party software.

SUMMARY

A method and apparatus are described for providing a graphical user interface for a plurality of users under a predetermined format substantially controlled by an employer of the plurality of users. The method includes the steps of disposing a proxy server between the plurality of users and an information resource used by at least one user of the plurality of users and converting information exchanged between the predetermined format substantially controlled by the employer of the user and a predetermined format of the information resource.

DETAILED DESCRIPTION OF AN ILLUSTRATED EMBODIMENT

Figure 1:
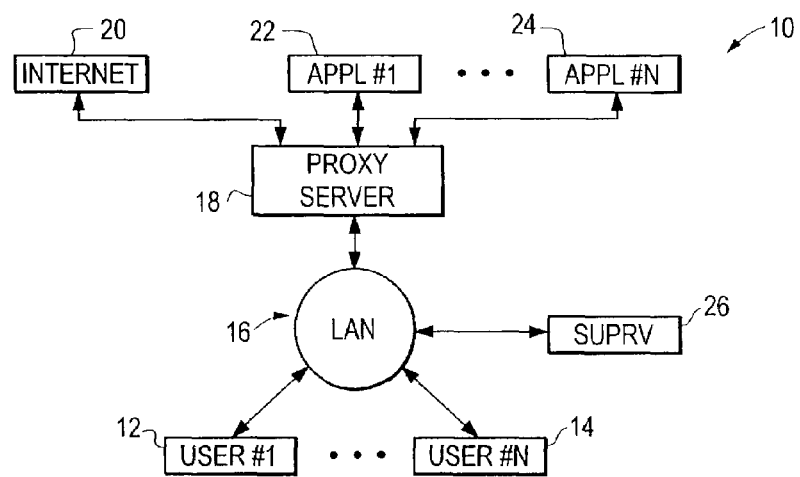
FIG. 1 is a block diagram of an organizational computer processing system in accordance with an illustrated embodiment of the invention.

FIG. 1 depicts a functional block diagram of an organizational computer processing system 10, shown generally under an illustrated embodiment of the invention. Under the illustrated embodiment, a number of user terminals 12, 14 may interact with the Internet 20 and applications 22, 24 of the computer system 10 through a local area network (LAN) 16. The applications 22, 24 may be any of a number of well-known, conventional, third-party software applications (e.g., accounting, purchasing, order processing, payroll, time-entry, engineering change order systems, etc.).

Included within the system 10 is a proxy server 18 that functions to provide a common interface between the users 12, 14 and the applications 22, 24 and between the users 12, 14 and the Internet 20. As used herein a common interface means that the third party applications 22 all have a common appearance to the users 12, 14.

In effect, the proxy server 18 functions as a graphical user interface (GUI) provided under a predetermined format substantially controlled by an employer of the users 12, 14. As used herein, a graphical user interface provided under a predetermined format substantially controlled by the employer means that the operational screens on the terminals of each of the employees (i.e., users 12, 14) are provided with information display areas, data entry areas and software control areas that are substantially alike among the applications 22, 24, but that a user 12, 14 may change the look and feel (i.e., the presentation) of those areas to a limited extent without changing the overall functionality of those areas.

Figure 2:
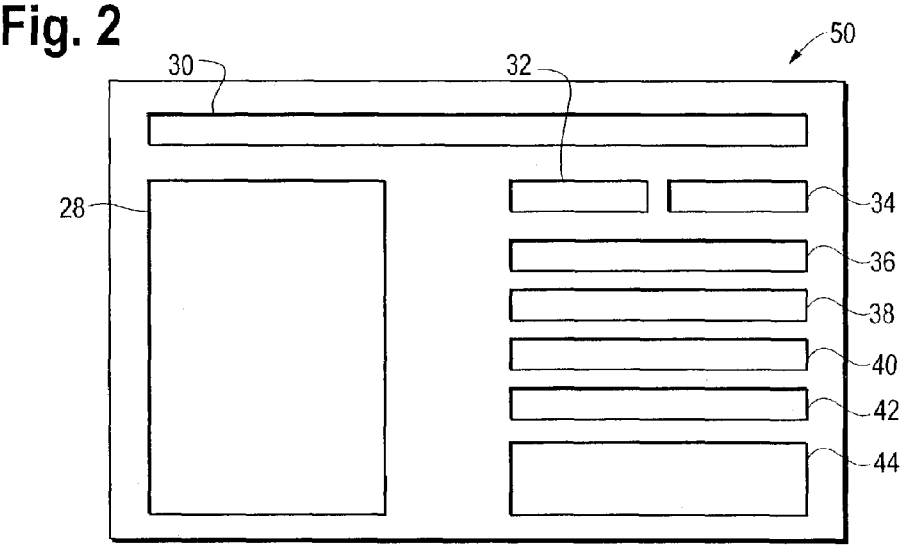
FIG. 2 is a graphical user interface that may be used by the system of FIG. 1.

For example, the proxy server 18 may function based upon the use of a predetermined number of windows that may be written onto the screens of the users 12, 14 under an html format. FIG. 2 is an example of a screen 50 that may be used to display and receive data. Data from the applications 22, 24 may, when activated, be mapped into a data window 28. Control features may be mapped into control windows 32, 34, 36, 38, 40, 44. Data entry may be mapped into a data entry window 42. By mapping equivalent control and display features into the same window, a user 12, 14 would be expected to experience far less difficulty and need far less training to operate a range of different applications 22, 24.

While the use of the windows may be controlled by the employer, the presentation of the window may be controlled by the user 12, 14 through a toolbar 30. Accordingly, a user may select the size, location, color and font size of a window and what is displayed within the window to suit the preferences of the user 12, 14.

Figure 3:
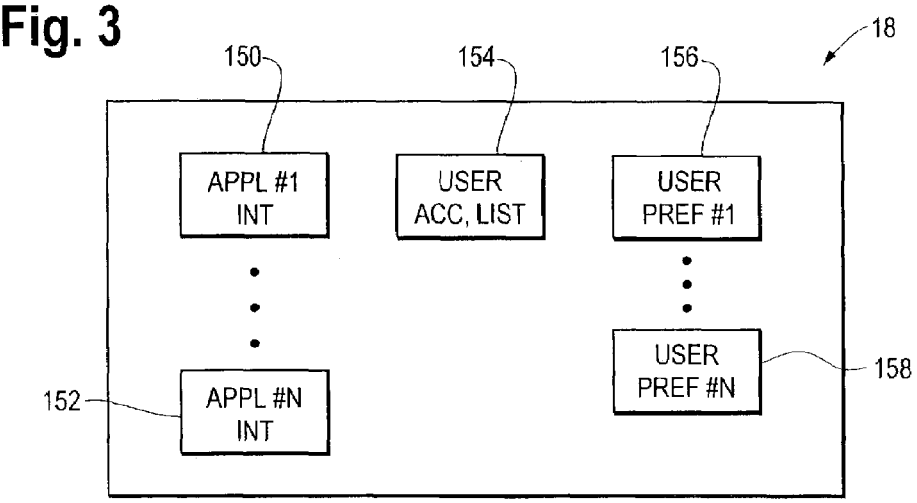
FIG. 3 is a block diagram of a proxy server that may be used by the system of FIG. 1.

FIG. 3 is a block diagram of the proxy server 18. Included within the proxy server 18 may be a translation program 150, 152 associated with each application 22, 24. The translation programs function to receive information from the applications 22, 24 and map the information into the common format perceived by the user 12, 14. The translation programs 150, 152 also receive information entered by the user 12, 14 and may map that information into the format required by the application 22, 24.

The proxy server 18 may be used with a variety of different applications 22, 24. Where the application 22, 24 is supplied with a pre-existing GUI under html, then the proxy server 18 may function simply to parse the data and control features into their components and display these components in their respective predetermined windows 28, 32, 34, 36, 38, 40, 42, 44. Where the application 22, 24 displays information in a real-time mode with a static (i.e., pull-down) menu structure, then the proxy server 18 may be provided with a customized interface to the application 22, 24 appropriate to the situation.

Also included within the proxy server 18 may be a user access list 154 and a set of user preference lists 156, 158. The user access list 154 may be controlled by a supervisor 26. The supervisor 26 may control who has access to the applications 22, 24 and to the Internet 20 and also what sites a user 12, 14 may access. The supervisor 26 may grant access to a user 12, 14 by entering an identifier of the user 12, 14 into a respective application or Internet file of the user access list 154. The supervisor 26 may also enter a list of websites that a user 12, 14 may need access to in order to perform some task.

The user preference list 156, 158 may be controlled by the user 12, 14. Within the user preference list 156, 158, the user 12, 14 may store personal preferences providing limited control over how information is displayed on the terminal 12, 14 of the user.

It should be noted in this regard that placing the user preference list 156, 158 in the proxy server 18 allows the user's preferences to follow him/her around no matter what terminal the person uses. For example, in the case of FIG. 2, if the user should want the data window 28 on the right side of the display, instead of the left, then the user 12, 14 may save that configuration in his/her user preference list 156, 158. Following start-up, the proxy server 18 would always place the data in that same location no matter what terminal the user 12, 14 is assigned to operate.

Upon activation of a terminal 12, 14 of a user, the terminal may search the LAN 16 for a server 18. The server 18 may respond with a notification of its presence and may download a sign-on screen. The user 12, 14 may enter a personal identifier and be granted access to the system 10.

Figure 4:
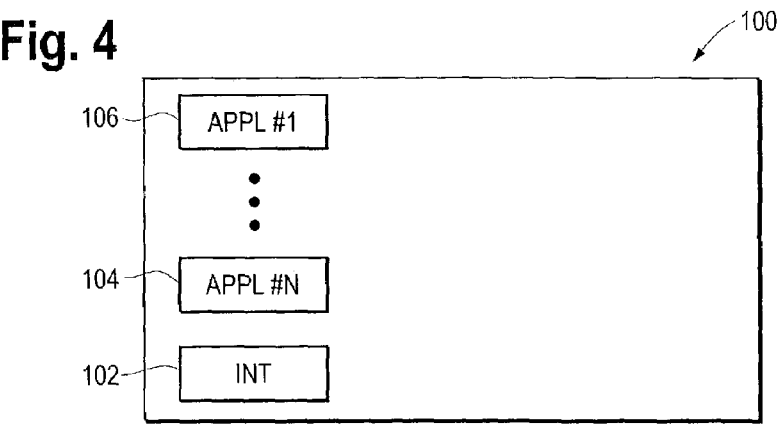
FIG. 4 depicts a screen that may be presented to a user of the system of FIG. 1.

FIG. 4 depicts a screen 100 that may be displayed to a user 12, 13 following sign-on. The screen 100 may be displayed under an html format and may included an icon 104, 106 representing each of the third-party applications 22, 24 and the Internet 102.

It should be noted in this regard that the display of icons 102, 104, 106 are dependent upon the user access list 154. If the user 12, 14 is not allowed access to an application 22, 24 or the Internet, that icon 102, 104, 106 would not be displayed on the user's terminal 12, 14.

Each icon 102, 104 may be associated with a hyperlink to a respective translation program 150, 152. For example, activating the first icon 106 may activate the first translation program 150. Similarly, activation of the second icon 104 may activate the second translation program 152.

Figure 5:
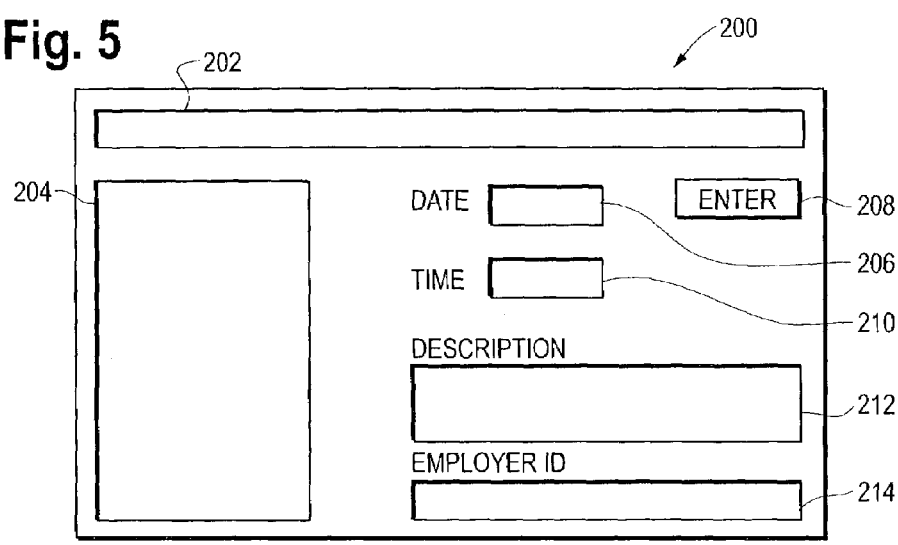
FIG. 5 depicts a graphical user interface for a specific application that may be used by the system of FIG. 1.

FIG. 5 depicts an example wherein it is assumed that a user 12, 14 wishes to do time entry using a time entry application (e.g., 22). To do time entry, the user (e.g., 12) may activate a first icon 106. Activation of the icon 106 activates a first translation program 150 within the proxy server 18. The first translation program 150, in turn, may activate the time entry application 22.

Before displaying the translated application 22 on the terminal 12, 14, the proxy server 18 may first retrieve a user preference list 156, 158 based upon the identifier of the user 12, 14 provided during sign-on. If the user 12, 14 should choose and store in his preferences list the format shown in FIG. 2, then the time entry screen 200 of FIG. 5 may be displayed.

In FIG. 5, a first window 204 may be used to display entered time information. A second and third window 206, 210 may be used to enter a date and time. A fourth window 212 may be used to enter a work description of entered time. A sixth window 208 may be used to accept entered data. A seventh window 214 may display an identifier of the employee.

It should be noted that not all of the windows shown in FIG. 2 are needed for time entry in FIG. 5. Accordingly, the proxy server 18 only shows those windows in FIG. 5 with a specifically assigned function.

Figure 6:
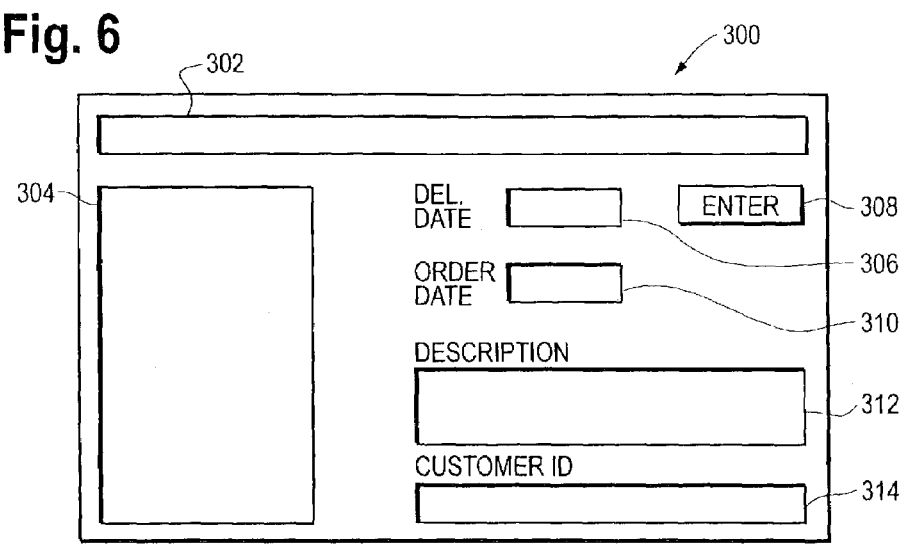
FIG. 6 depicts a graphical user interface for another specific application that may be used by the system of FIG. 1.

FIG. 6 depicts a screen 300 that may be created by the proxy server 18 for entry of customer order information. As above, with FIGS. 2 and 5, a first window 304 may be used to display data (in this case previous customer ordering information). A second and third window 306, 310 may be used to enter a requested delivery date and an order date respectively. A fourth window 312 may be used to enter product information and a fifth window 314 may contain a customer identifier. A sixth window 308 may be used to accept entered information.

In another embodiment of the invention, the proxy server 18 may be used to translate website information from third-party websites into the common format of FIG. 2, as described above. In addition to translating website information, the proxy server 18 may also function as a filter to block pop-up ads and/or other objectionable materials.

In another embodiment, the proxy server 18 may also function to control instant messaging. In it simplest form, the supervisor may provide a messaging access level for each user 12, 14 that may be saved in the user access list 154. The proxy server 18 may seize and process each message based upon the messaging access level of the message sender and addressee. In general, only messages between users (i.e., between employees) 12, 14 would be allowed. All other messages would be blocked.

Alternatively, the supervisor may set any messaging level from full access to no messaging access at all. Where the proxy server 18 detects a message that exceeds the user messaging access level, the message may be discarded or routed to the supervisor. Where routed to the supervisor, the supervisor may print out the message for the appropriate disciplinary action.

A specific embodiment of a method and apparatus for providing a GUI interface in an organizational context according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention, any and all modifications, variations, or equivalents that fall within the true spirit and scope of the basic underlying principles disclosed and claimed herein.

The invention claimed is:

1. A method of providing a graphical user display interface format which determines visual layout of user displays for a plurality of users that operates under a predetermined common graphical user display format substantially controlled by an employer of the plurality of users, such method comprising the steps of:
   disposing a proxy server between the plurality of users and a plurality of information resources used by the plurality of users, each of the information resources having a different predetermined graphical user display interface format;
   detecting selection of an information resource of the plurality of information resources by a user of the plurality of users;
   converting in the proxy server information delivered from the selected information resource to the user from the respective predetermined graphical user display interface format of the selected information resource to the predetermined common graphical user display format substantially controlled by the employer of the user; and
   wherein the converting step customizes visual layout of displays of the plurality of users to that of the common graphical user display format of the employer of the plurality of users.

2. The method of providing a graphical user interface as in claim 1 wherein the step of converting information delivered from the selected information resource further comprises converting information from the at least one user to the selected information resource between the predetermined format substantially controlled by the employer of the user and a predetermined format of the information resource.

3. The method of providing a graphical user interface as in claim 1 further comprising storing a user access list for each of the plurality of users in the proxy server.

4. The method of providing a graphical user interface as in claim 3 further comprising providing an access path for each user only to those information resources identified by the access list of the user.

5. The method of providing a graphical user interface as in claim 1 further comprising modifying the presentation of the predetermined format substantially controlled by the employer to suit the preferences of each user.

6. The method of providing a graphical user interface as in claim 1 wherein the information resources further comprises a plurality of different applications with different user interfaces provided by a third-party supplier.

7. The method of providing a graphical user interface as in claim 1 wherein the information resource further comprises at least one of an engineering change order application, an Internet server, and a time entry application.

8. The method of providing a graphical user interface as in claim 1 wherein the converting comprises mapping data from the selected information resources into a predetermined data window of the common user format.

9. The method of providing a graphical user interface as in claim 1 wherein the predetermined format substantially controlled by the employer further comprises a predetermined plurality of windows available for display on a terminal of each user of the plurality of users.

10. The method of providing a graphical user interface as in claim 9 wherein the predetermined plurality of windows further comprises an interactive window for entering information.

11. The method of providing a graphical user interface as in claim 1 wherein the step of converting information further comprises seizing an instant message and retrieving a messaging access level for one of the sender and intended receiver of the message.

12. The method of providing a graphical user interface as in claim 11 further comprising storing a user preference list in the proxy server which allows user preferences to follow the user to any of a plurality of user terminals.

13. An apparatus for providing a graphical user display interface format which determines visual layout of user displays for a plurality of users that operates under a predetermined common graphical user display format substantially controlled by an employer of the plurality of users, such apparatus comprising:
   a proxy server disposed between the plurality of users and a plurality of information resources used by the plurality of users each of the plurality of information resources having a different predetermined graphical user display format;
   means for detecting selection of an information resource of the plurality of information resources by a user of the plurality of users;
   means within the proxy server for converting information delivered from the selected information resource to the user from the respective predetermined graphical user display format of the selected information resource to the predetermined common graphical user display format substantially controlled by the employer of the user; and
   wherein the means for converting customizes visual layout of displays of the plurality of users to that of the common graphical user display format of the employer of the plurality of users.

14. The apparatus for providing a graphical user interface as in claim 13 wherein the means for converting information delivered from the selected information resource further comprises means for converting information from the at least one user to the selected information resource between the predetermined format substantially controlled by the employer of the user and a predetermined format of the information resource.

15. The apparatus for providing a graphical user interface as in claim 13 further comprising means for storing a user access list for each of the plurality of users in the proxy server.

16. The apparatus for providing a graphical user interface as in claim 15 further comprising means for providing an access path for each user only to those information resources identified by the access list of the user.

17. The apparatus for providing a graphical user interface as in claim 13 further comprising means for modifying the presentation of the predetermined format substantially controlled by the employer to suit the preferences of each user.

18. The apparatus for providing a graphical user interface as in claim 13 wherein the information resource further comprises a plurality of different applications with different user interfaces provided by a third-party supplier.

19. The apparatus for providing a graphical user interface as in claim 13 wherein the information resource further comprises at least one of an engineering change order application, an Internet server, and a time entry application.

20. The apparatus for providing a graphical user interface as in claim 13 wherein the means for converting information further comprises means for mapping data from the selected information resource into a predetermined data window of the common user format, for mapping control features into a predetermined control window, and for mapping data entry into a predetermined data entry window.

21. The apparatus for providing a graphical user interface as in claim 13 wherein the predetermined format substantially controlled by the employer further comprises a predetermined plurality of windows available for display on a terminal of each user of the plurality of users including an interactive window for entering information.

22. The apparatus for providing a graphical user interface as in claim 21 wherein a user preference list is stored in the proxy server which allows user preferences to follow the user.

23. An apparatus for providing a graphical user display interface format which determines visual layout of user displays for a plurality of users that operates under a predetermined common graphical user display format substantially controlled by an employer of the plurality of users, such apparatus comprising:
   a proxy server disposed between the plurality of users and a plurality of information resources used by the plurality of users, each of the plurality of information resources having a different predetermined graphical user display format;
   a hyperlink adapted to detect selection of an information resource of the plurality of information resources by a user of the plurality of users;
   a translation application within the proxy server adapted to convert information delivered from the selected information resource to the user from the respective predetermined graphical user display format of the selected information resource to the predetermined common graphical user display format substantially controlled by the employer of the user; and
   wherein the translation application customizes visual layout of displays of the plurality of users to that of the common graphical user display format of the employer of the plurality of users.

24. The apparatus of claim 23 wherein the predetermined common user format comprises a data window, a control window, and a data entry window, and the translation application maps data from the selected information resource into the data window, maps control features into the control window and maps data entry into the data entry window.

* * * * *